United States Patent
Zielinski et al.

(10) Patent No.: US 10,073,172 B2
(45) Date of Patent: Sep. 11, 2018

(54) APPARATUS, VEHICLE, METHOD, COMPUTER PROGRAM AND RADIO SYSTEM FOR RADIO SUPPLY IN A PREDEFINED SPACE

(71) Applicant: VOLKSWAGEN AG, Wolfsburg (DE)

(72) Inventors: Ernst Zielinski, Bochum (DE);
Matthias Mohaupt, Bochum (DE);
Jens Kampermann, Haan (DE);
Wolfgang Theimer, Bochum (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/659,659

(22) Filed: Jul. 26, 2017

(65) Prior Publication Data

US 2018/0031693 A1 Feb. 1, 2018

(51) Int. Cl.
| | |
|---|---|
| *H04M 1/00* | (2006.01) |
| *G01S 13/75* | (2006.01) |
| *H01Q 1/32* | (2006.01) |
| *H04H 20/53* | (2008.01) |
| *H04H 20/71* | (2008.01) |

(52) U.S. Cl.
CPC ......... *G01S 13/756* (2013.01); *H01Q 1/3216* (2013.01); *H04H 20/53* (2013.01); *H04H 20/71* (2013.01)

(58) Field of Classification Search
CPC ....... G01S 13/756; H04H 20/71; H04H 20/53
USPC .......................................... 455/569.2, 562.1
See application file for complete search history.

(56) References Cited

U.S. PATENT DOCUMENTS

| | | | |
|---|---|---|---|
| 5,697,063 A | 12/1997 | Kishigami et al. | |
| 9,020,554 B2* | 4/2015 | Tee ..................... | H04W 52/346 370/318 |
| 9,595,753 B2* | 3/2017 | Hirose ................. | H01Q 1/3241 |
| 9,768,501 B2* | 9/2017 | Maltsev .............. | H01Q 3/2694 |
| 2010/0156721 A1 | 6/2010 | Alamouti et al. | |
| 2015/0171510 A1 | 6/2015 | Hirose | |

FOREIGN PATENT DOCUMENTS

JP        2009204344 A        9/2009

* cited by examiner

*Primary Examiner* — Sonny Trinh
(74) *Attorney, Agent, or Firm* — Barnes & Thornburg LLP

(57) ABSTRACT

An apparatus, a vehicle, a method, a computer program and a radio system for radio coverage in a predefined space. The method includes operating at least one transmission and/or reception antenna in the predefined space to cover at least one subregion of the predefined space using at least one element having an active area in the predefined space taking into consideration the subregion to be covered, wherein the active area of the element influences the propagation conditions of signals of the radio system.

19 Claims, 9 Drawing Sheets

Fit at least one transmission and/or reception antenna — 12

Fit at least one element having an active area — 14

US 10,073,172 B2

APPARATUS, VEHICLE, METHOD, COMPUTER PROGRAM AND RADIO SYSTEM FOR RADIO SUPPLY IN A PREDEFINED SPACE

PRIORITY CLAIM

This patent application claims priority to German Patent Application No. 10 2016 213 703.4, filed 26 Jul. 2016, the disclosure of which is incorporated herein by reference in its entirety.

SUMMARY

Illustrative embodiments relate to a vehicle, an apparatus, a method, a computer program and a radio system for radio coverage in a predefined space, particularly, but not exclusively, to the purposeful fitting of reflectors and/or absorption areas for a radio system, in the interior of a vehicle.

BRIEF DESCRIPTION OF THE DRAWINGS

Disclosed embodiments are described in more detail below on the basis of the drawings, to which, however, exemplary embodiments generally are not restricted overall. In the drawings.

DETAILED DESCRIPTION

Figure 1:
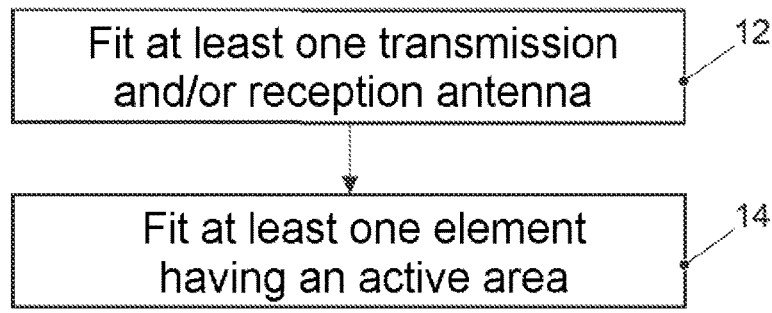
FIG. 1 shows a flowchart for an exemplary embodiment of a method for installing a radio system in a predefined space.

Mobile devices are being used to an ever greater extent in enclosed spaces too (also referred to as indoors). In vehicles, for example, such as automobiles, trains, airplanes, buses, ships, etc., mobile devices are used for communication, for entertaining the passengers, for forwarding relevant information about the vehicle condition or about the traffic situation on the planned route, etc. In this case, it may be useful to distribute information in a targeted manner in the space, for example, depending on the position of the mobile device in the space, e.g., in the passenger compartment. By way of example, an incoming telephone call or an update to the route information can be signaled to the mobile device of the driver. A game for entertainment can cover all mobile devices of the passengers apart from the mobile device of the driver. For such an association, it is expedient to know the whereabouts of the mobile terminal in the space, e.g., in the vehicle. It is then possible to match transmission concepts to the whereabouts and accordingly to adapt a quality of service or a transmission capacity. By way of example, it is possible for spatial transmission concepts to be improved based on a piece of information about a whereabouts of a terminal.

It is to be expected that the use of locating techniques for position estimation for mobile terminals will become more and more important in the next few years to improve user satisfaction (also referred to as the user experience). Particularly in vehicles, this results in many impressive opportunities for use. The use of radio engineering for locating purposes can give rise to additional costs, which are caused by complex calibration. One possible method for calibrating an implementation of antenna units in a vehicle performs calibration by using one or more test transmitters that are placed at multiple predefined positions in the vehicle interior, and in this way calibration parameters can be measured. Detection of an occupancy in the vehicle interior is further performed by means of additional sensors, for example, by means of pressure sensors or switches integrated in seats.

Mobile devices may be mobile radios according to one or more standardized mobile radio standards. These may be suitable for near field communication and/or for spanning longer distances. Passenger compartments are known in a wide variety of orders of magnitude and comprise compartments for motor cars, motor homes, trucks and even the passenger compartment of buses, trains, airplanes, ships, etc.

A further possibility for locating is implemented using an ultrasonic pen. In this case, the pen emits an infrared light pulse that propagates at the speed of light. This light impulse is detected by an infrared diode. At the same time, the pen emits an ultrasonic signal that is picked up by two ultrasonic microphones. Since sound propagates only in approximately 330 meters/second, the time difference in relation to the optical signal can be used to detect the distance and, as a result of a distributed position of microphones, the direction of the signal in one plane. However, this concept for locating mobile devices is sometimes less suitable, since the pen is not constantly in proximity to the mobile device. Alternatively, the mobile device could send infrared light pulses and ultrasonic signals, which would have an influence on its supply of energy and, moreover, is normally not provided for in commercially available mobile devices.

Locating methods that are based on the propagation properties of electromagnetic waves are further known. Different RF technologies in frequency ranges from a few kilohertz through to ultrawideband (UWB) technology at frequencies between 3.2 and 10.6 gigahertz are used in this case. In this case, the item to be located is provided with an applicable marking, for example, a radio frequency identification transponder (RFID tag), to be locatable. However, this requires the mobile devices to have a supplementary element mounted on them, for example, the aforementioned RFID tag. This can be handled only in a complex way, particularly when there are changing mobile devices in the passenger compartment.

Possible locating technologies outside the passenger compartment and the vehicle are based on GPS (global positioning system) or on triangulation of signals from base stations, which are used for cellular mobile radio, for example. However, this position finding is too inaccurate to determine the position of a terminal in a space that, for example, comprises just a passenger compartment. Electromagnetic waves are moreover transmitted into enclosed spaces only with attenuation and/or distortion, and this can have an influence on locating within the space.

The use of mobile (radio) terminals in a vehicle and around a vehicle is now part of everyday life. The modern vehicle is/will be equipped with radio engineering as a rule. This radio engineering affords, inter alia, data communication via, e.g., BLUETOOTH®, wireless local area network (WLAN), Long Term Evolution (LTE), 802.11p, etc. Furthermore, there is the possibility of significantly improving the service and user experience (satisfaction) in a vehicle by locating mobile radio terminals in/around the vehicle.

This is taken into account by an apparatus, a method, a radio system and a vehicle each having the features disclosed herein.

Exemplary embodiments are based on the central idea of introducing, in a predefined space, elements having at least one active area for the purpose of influencing the signals or fields of a radio system. As a result, subregions can be formed that can be reached to a better or worse degree from certain antenna positions. Spatial dividability of individual coverage subregions that is improved by means of the elements allows a common-mode interference situation and/or illumination in the predefined space to be improved. Exemplary embodiments can thus allow an opportunity for shaping coverage for a radio system. This makes it possible to achieve benefits for transmission capacity, for system capacity and for quality of service.

Some exemplary embodiments are further based on the central idea of using intelligent antennas (beamforming, e.g., via phase array) in combination with reflectors/absorption areas fitted in the vehicle interior to manipulate the radio channel or the coverage situation. This strategy can be an inexpensive way of increasing the quality of the aforementioned techniques. Exemplary embodiments can thus contribute to improving the BT/WLAN link by improving the reception strength and lowering perturbations. Furthermore, an improvement in the locating of mobile (radio) terminals can be achieved by implementing meaningful reception characteristics. Exemplary embodiments can provide an improved concept for a radio system for a predefined space.

Exemplary embodiments provide a method for installing a radio system in a predefined space. The method comprises operating at least one transmission and/or reception antenna in the predefined space for the purpose of covering at least one subregion of the predefined space. The method further comprises using at least one element having an active area in the predefined space taking into consideration the subregion to be covered, wherein the active area influences the propagation conditions of signals of the radio system. Exemplary embodiments can use the active area of the element to influence the electromagnetic field or a signal distribution in the predefined space, this being able to be exploited to optimize the coverage and/or interference situation in the space.

In some exemplary embodiments, the active area may be an absorption area or a reflection area. By using an absorption area, it is possible to avoid or at least reduce reflections. By using a reflection area, it is possible to bring about and direct reflections purposefully. This can allow or at least facilitate shaping or design of a coverage region.

By way of example, the predefined space can have a shadowing region for the at least one transmission and/or reception antenna, and the element can be used such that a coverage quality of the radio system in the shadowing region is increased. By way of example, the reflections produced can be used to backlight a shadowing object.

In some exemplary embodiments, the element can be fitted such that a shadowing region for the at least one transmission and/or reception antenna is produced in the predefined space by the element. Exemplary embodiments can thus permit purposeful introduction of shadowing regions. This can be beneficial, by way of example, when multiple antennas that produce a direction-dependent reception/transmission characteristic (or provide different antenna patterns/radiation patterns) are used (including beamforming to produce or select different radiation characteristics).

In exemplary embodiments, it is generally possible for any radio systems to be used; besides the cellular systems, it is also possible for shorter-range systems, such as, e.g., a BLUETOOTH® system or a wireless local area network system, to be used, the coverage of which in the predefined space can then be influenced, shaped or designed by the element accordingly.

In exemplary embodiments, multiple elements having active areas can be used for the purpose of dividing the predefined space into radio coverage subregions or sectors, and/or multiple antennas can be operated for the purpose of selection or beamforming. By way of example, multiple antennas or even beams can thus be used to address individual subregions that are shadowed for other antennas or beams, or allow attenuated signals, so that improved spatial separation of the subregions can be provided for the radio propagation conditions.

In some exemplary embodiments, the predefined space is an interior of a vehicle. Exemplary embodiments can thus allow selective coverage of the seats. In other words, the subregion can correspond to a seat in the interior of the vehicle that is then covered by means of the radio system. The element may then be arranged on the inside of the roof of the vehicle. In further exemplary embodiments, the method can also comprise using the element on a B pillar of the vehicle.

Exemplary embodiments also provide a radio system for providing coverage with radio services for a predefined space. The radio system comprises at least one transmission and/or reception antenna in the predefined space for the purpose of covering at least one subregion of the predefined space. The radio system further comprises an element having an active area that influences the propagation conditions of signals of the radio system, wherein the element is arranged in the predefined space taking into consideration the subregion to be covered. The active area may be, by way of example, an absorption area or a reflection area. The radio system is, e.g., a BLUETOOTH® system or a wireless local area network system. The radio system may be designed to cover two or more seats of the vehicle using the same frequency and time resources.

Exemplary embodiments also provide a vehicle having a radio system according to the description above. The element may be fitted, by way of example, on the inside of a roof or on a B pillar of the vehicle.

In general, exemplary embodiments may also be implemented as a program, firmware, a computer program or a computer program product having a program code or as data, wherein the program code or the data is or are active to the effect of performing one of the methods when the program runs on a processor, computer or a programmable hardware component. The program code or the data may also be stored on a machine-readable medium or data medium, for example. The program code or the data may be available, inter alia, as source code, machine code or byte code and as other intermediate code.

In some exemplary embodiments, transmission/reception units (having intelligent antennas) in combination with reflectors/absorption areas are installed in the vehicle, so that the data transmission quality and the locating quality are improved or are even optimal. In this case, the installation location is dependent on the vehicle type but for on the antennas and reflector properties (or properties of the absorption areas) used and the number thereof.

At least some exemplary embodiments can allow a cost reduction through the use of inexpensive reflectors/absorption areas and/or can achieve an improvement in the BT/WLAN link through improvement of the reception strength and lowering of perturbations. Furthermore, it may be possible to allow an improvement in the locating of mobile (radio) terminals through implementation of meaningful reception characteristics.

Various exemplary embodiments are now described in more detail with reference to the accompanying drawings, in which some exemplary embodiments are depicted. Optional features or components are depicted using dashed lines in this case.

Although exemplary embodiments may be modified and amended in various ways, exemplary embodiments are depicted as examples in the figures and are described thoroughly herein. It should be clarified, however, that there is no intention to restrict exemplary embodiments to the forms respectively disclosed, rather that exemplary embodiments are intended to cover all functional and/or structural modifications, equivalents and alternatives that lie within the scope of the embodiments.

It should be noted that one element denoted as "connected" or "coupled" to another element may be directly connected or coupled to the other element, or that intervening elements may be present. By contrast, if one element is denoted as "directly connected" or "directly coupled" to another element, then no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves merely to describe specific exemplary embodiments and is not intended to restrict the exemplary embodiments. As used herein, the singular forms "a", "an" and "the" are also intended to include the plural forms, as long as the context does not explicitly indicate something else. Furthermore, it should be clarified that the expressions such as, e.g., "includes", "including", "has", "comprises", "comprising" and/or "having", as used herein, indicate the presence of stated features, integers, operations, work sequences, elements and/or components, but do not exclude the presence or the addition of one or one or more features, integers, operations, work sequences, elements, components and/or groups thereof.

FIG. 1 shows a flowchart for an exemplary embodiment of a method for operating a radio system in a predefined space. The method comprises operating 12 at least one transmission and/or reception antenna in the predefined space for the purpose of covering at least one subregion of the predefined space. The method furthermore comprises using 14 at least one element having an active area in the predefined space taking into consideration the subregion to be covered, wherein the active area of the element influences the propagation conditions of signals of the radio system.

Figure 2:
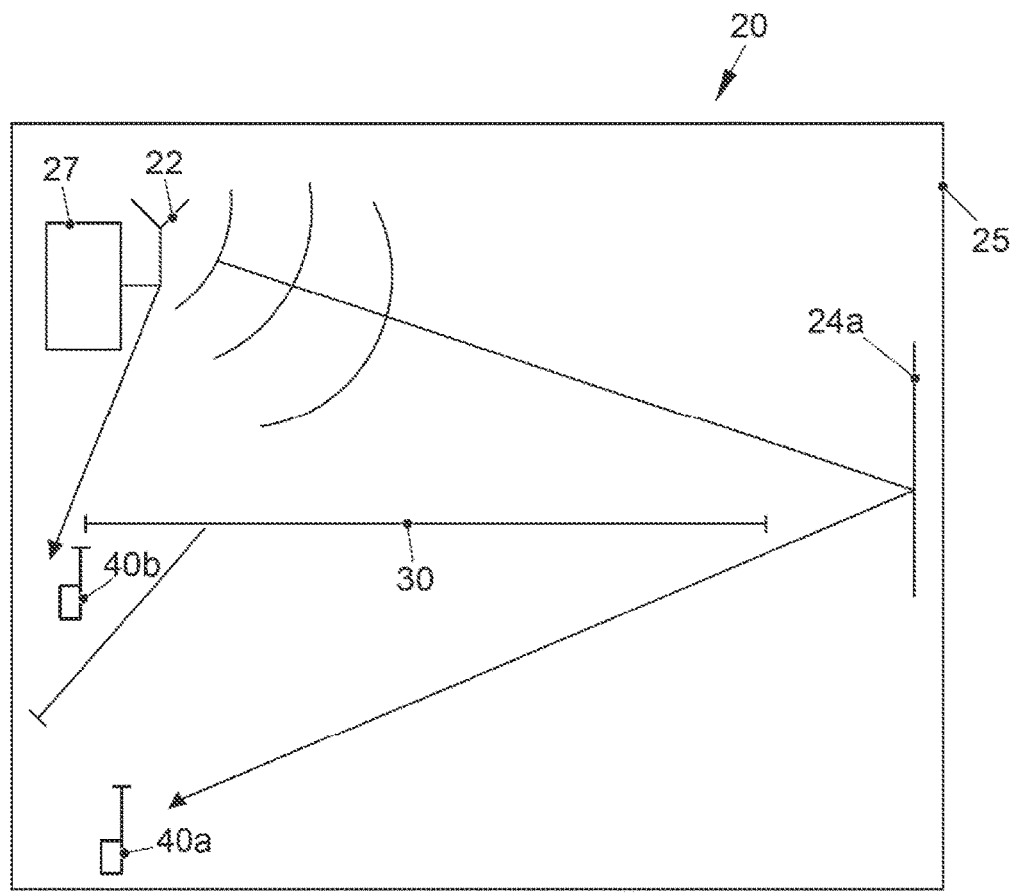
FIG. 2 shows an illustration of an exemplary embodiment of a radio system for providing coverage with radio services for a predefined space.

FIG. 2 shows an illustration of an exemplary embodiment of a radio system 20 for providing coverage with radio services for a predefined space 25. The radio system 20 comprises at least one transmission and/or reception antenna 22 in the predefined space 25 for the purpose of covering at least one subregion of the predefined space 25. The radio system further comprises an element 24a, 24b having an active area that influences the propagation conditions of signals of the radio system 20, wherein the element 24a, 24b is arranged in the predefined space 25 taking into consideration the subregion to be covered.

In exemplary embodiments, the radio system may also comprise further components, which are not depicted in detail in FIG. 2. These include one or more processors, amplifiers, filters, diplexers, duplexers, antennas, etc. These components are depicted in a simplified way in FIG. 2 as a control module or transceiver 27 of the radio system. In exemplary embodiments, the radio system can comprise, by way of example, a control module that correspond to any controller or processor or a programmable hardware component. By way of example, the control module may also be realized as software that is programmed for a corresponding hardware component. In this respect, the control module may be implemented as programmable hardware with appropriately adapted software. It is possible for any processors, such as digital signal processors (DSPs) to be used in this case. Exemplary embodiments are not limited to one type of processor in this case. Any processors or even multiple processors are conceivable for implementing the control module. Implementations in integrated form with other control units are also conceivable, for example, in a control unit for a vehicle, which additionally comprises one or more other functions. The method operations described herein can be carried out, in exemplary embodiments, by the control module or the transceiver of the radio system 25. In this respect, method operations described can be performed by the radio system 20.

The control module or the transceiver can correspond, by way of example, one or more inputs or interfaces for receiving or providing information or signals, for example, in digital bit values, voltages, currents or electromagnetic waves, for example, based on a code, within a module, between modules, or between modules of different entities. In this respect, the one or more interfaces are suitable for communicating, i.e., for sending and/or for receiving, signals using antenna units. In this case, there may be still further components present or connected between the one or more interfaces, examples being power amplifiers, filters, diplexers, duplexers, mixers, phase shifters, low noise amplifiers (LNAs), etc.

An antenna unit 22 or transmission and/or reception antenna 22 can comprise one or more antenna elements that are designed for sending and/or for receiving. It is also conceivable for an antenna unit to comprise different antenna elements for sending and for receiving. Antenna elements of different types can be used in this case, examples being dipoles, horn antennas, patch antennas, magnetic antennas, etc. The individual antenna elements may be arranged in predefined geometries in this case, for example, e.g., linearly, circularly, rectangularly, triangularly, etc. Constructive or destructive superposition of the signals by means of the antenna elements, which is also called beamforming, allows preferential directions or main radiation directions (constructive superposition) and attenuation directions (destructive superposition) to be produced relative to an antenna unit in exemplary embodiments. This takes place as a result of appropriate phases and/or amplitude variations in the signals on the individual antenna elements. These can then be used for ascertaining incident directions of signals too, for example. Incident directions and also radiation directions can then be used for locating or ascertaining the position of transmitters or receivers, for example.

If the positions are ascertained by using a radio signal sent by the mobile device 40a and/or 40b, for example, cf. FIG. 2, then the position of the mobile device can be characterized by the field strength measurements at the antenna for a variation of the phase differences. In this case, the antenna may be embodied as a group antenna, in which antennas are constructed from a number of single antenna elements whose radiated fields overlap and, through constructive superposition, form to produce a shared antenna pattern. The reception direction of the signal can be ascertained using a two-antenna array (antenna array with 2 antenna elements) and adjustable phase shifters, for example. To this end, the received signals from the two antennas have their phases shifted relative to one another in n operations (for example, n=8, n=16) and are then added. From the signal strength of the summed signal, it is possible to estimate the reception direction. This corresponds to the direction that is associated with the strongest summed signal (best antenna lobe).

When one antenna is actually used, it is possible to ascertain the whereabouts of the sought device for specific spatial conditions, if need be by using the spatial geometry of the mobile or predefined space. When multiple antennas are used, it is possible to ascertain the position of the sought device from multiple direction estimates. The sectional area of the "best" antenna lobes (also called beams) of the individual antenna arrays yields the position estimate.

In this case, the ascertainment of the position can be performed using different accuracies, depending on technical options and envisaged use. As such, the position finding can yield a region in which the item is situated. This region may be a section on which the mobile device is situated within the movable or predefined space. Further, ascertainment of the position can also be performed with greater or lesser pinpoint accuracy. In this case, the ascertainment of the position always relates to a reference system. An absolute reference system in this case is the earth, for example, for which the ascertained position may be indicated in degrees longitude and latitude, for example. A relative ascertainment of the position can also relate to an item in a space, the space itself being able to be mobile in its environment. As such, the predefined space may be a passenger compartment or an interior of a vehicle, for example. In general, ascertainment of the position (or of a relative position in the space) can also be understood as locating.

In the case of a passenger compartment having two seats, the mobile devices of the driver and the passenger can be distinguished sufficiently accurately using an antenna, which may have the appearance of an antenna array. Applications in other movable or predefined spaces are also possible, these being able to be configured as part of a test arrangement for physiological tests for multiple tested people, for example.

It is therefore possible to ascertain the mobile device associated with the driver, for example, which may be embodied as an item of clothing (wearable, e.g., smartwatch) for the purpose of capturing his physiological parameters. These can then be taken into consideration in a system for actively influencing driving behavior, for example. By contrast, the physiological parameters of passengers are irrelevant for this system.

Optionally, the method can comprise receiving the radio signal of the mobile device using a second antenna. Further, it can comprise ascertaining a second reception direction of the radio signal of the mobile device relative to the orientation of the second antenna. Further, it can comprise ascertaining the position of the mobile device taking into consideration the first and second reception directions of the radio signal.

In this case, the ascertainment of the position can be based on two reception directions. Depending on the arrangement of the antennas in the movable or predefined space, it is therefore possible to sense the position of the mobile device more accurately. It is thus possible for an antenna lobe (beam), for example, a funnel, of one antenna, using the antenna lobe of the second antenna, to yield a sectional area of the two antenna lobes in or at which the mobile device is located. It is beneficial in this regard for the antennas to be placed or arranged such that the reception angles of the two antennas differ significantly. As such, position ascertainment is more accurate with a difference of approximately 90 degrees than with 10 degrees, for example.

If, for example, there is a need for position finding for mobile devices within a passenger compartment based on seat position, then it is possible to arrange at least three antennas. Given expedient positioning of the antennas, this results in a sectional volume that is formed by the now three antenna lobes corresponding to the three reception directions. By taking into consideration these three antenna lobes, it is normally possible to associate the mobile device with a seat in the passenger compartment with sufficient accuracy. It is thus possible to distinguish the mobile device of the driver from the mobile devices of the passengers, for example. Even in passenger compartments having seats split into multiple rows of seats, it is thus possible to associate the mobile devices with the seats with sufficient accuracy. There is also benefit in arrangements having four antennas, which further increase the certainty or reliability of position ascertainment. Antennas are designed to sense electromagnetic radiation. They are known in many designs and can comprise planar antennas, group antennas, linear antennas and magnetic antennas, for example. If a plurality of antennas are arranged in a suitable manner, for example, then, in addition to sensing the electromagnetic radiation, it is also possible to ascertain the direction of the radiation.

This is achieved with antenna arrays, for example, or group antennas. Antenna arrays are distinguished by a plurality of single antenna elements that are actuated individually. A typical distance between the antenna elements is half the wavelength (lambda/2) or more in the observed frequency range. Further, antenna arrangements can also comprise a plurality of antenna arrays, so that a position, for example, of a mobile device, can be sensed more accurately from a variety of directions. The antennas are arranged at a fixed location in the movable or predefined space. Antennas can also be supported by sensors to be used collectively for locating mobile devices. Subsequently, the radiation characteristics of the antenna units are understood to mean different radiation directions (main beam directions), for example, as indicated by the dashed lines in the figures that follow. In some further exemplary embodiments, an antenna unit 22 comprises multiple antenna elements and the radiation characteristics correspond to different beamforming modes with different main radiation directions.

Mobile devices 40a, 40b are usually equipped with communication devices for wireless transmission of data. This also includes radio engineering. Thus, commercially available mobile devices comprise a plurality of standardized radio technologies that are suitable for data transmission. The standardization means that they are compatible with other commercially available mobile devices or associated networks, so that it is fundamentally possible for data communication to take place between the mobile devices. By way of example, it is possible to cite the standards for cellular mobile radio such as GSM (global system for mobile communications), UMTS (universal mobile telecommunications system) and LTE (long term evolution), which are suitable for worldwide connections. For near field communication, WLAN (wireless local area network), NFC (near field communication), BLUETOOTH® and UWB (ultrawideband technology) are known as radio standards that can communicate from a range of a few centimeters to a few 100 meters. However, it is also possible for other radio standards or even proprietary systems to be used for data transmission. The mobile devices may be designed in different sizes and can comprise what are known as mobiles or cellphones and what are known as tablets and also other sizes. They may also be watches, jewelry, items of clothing (what are known as wearables), spectacles, pills that can be swallowed by human beings or animals or other items, so long as they can communicate by radio.

In exemplary embodiments, the antenna units may be adapted to the radio system, a mobile radio system or mobile communication system 20, such as BLUETOOTH®, wireless local area network (WLAN), WirelessFidelity (WiFi), mobile radio, etc. In this case, mobile radio systems standardized by appropriate standardization committees, such as, e.g., the 3rd Generation Partnership Project (3GPP) group, can be considered, for example. By way of example, these comprise the Global System for Mobile communications (GSM), enhanced data rates for GSM evolution (EDGE), GSM EDGE radio access network (GERAN), the universal terrestrial radio access network (UTRAN) or the evolved UTRAN (E-UTRAN), such as, e.g., the universal mobile telecommunication system (UMTS), long term evolution (LTE) or LTE-Advanced (LTE-A), fifth-generation system (5G) or even mobile radio systems of other standards, such as, e.g., Worldwide Interoperability for Microwave Access (WIMAX), IEEE802.16 or wireless local area network (WLAN), IEEE802.11, and also generally a system that is based on a time division multiple access (TDMA) method, frequency division multiple access (FDMA) method, code division multiple access (CDMA) method, orthogonal frequency division multiple access (OFDMA) method or another technology or multiple access method. Subsequently, the terms mobile radio system, mobile radio network, mobile communication system and mobile radio network are used synonymously.

It is subsequently assumed that a mobile radio system of this kind comprises at least one stationary transceiver in the sense of a base station that has a link to the circuit-connected portion of the mobile radio network. On the other hand, it is assumed that the mobile radio network comprises at least one mobile transceiver (mobile radio terminal), the term mobile in this case being intended to relate to the fact that this transceiver is used to communicate via the air interface, i.e., wirelessly/cordlessly. A mobile transceiver of this kind can correspond to a portable telephone, a smartphone, a tablet computer, a portable computer, a vehicle or a radio module, for example, that is not necessarily mobile in the sense that it actually moves in relation to its surroundings. The transceiver may also be stationary (e.g., relative to a motor vehicle), but can communicate wirelessly with the mobile radio network. In this respect, the base station already mentioned can correspond to a base station of one of the aforementioned standards, for example, a NodeB, an eNodeB, etc.

In the exemplary embodiment of FIG. 2, there is, in the space, a shadowing object 30 that shadows the signals shown in the FIG. above from the lower region of the space 25. In this respect, in the exemplary embodiment, the lower region of the predefined space 25 corresponds to the subregion to be covered. FIG. 2 illustrates two exemplary embodiments in this case. In the first exemplary embodiment, the mobile 40a to be covered is arranged in the shadowed subregion and hence there is no line of sight between the mobile 40a and the transmission and/or reception antenna 22. The element 24a, which may be a reflector in this exemplary embodiment, reflects the signals of the antenna 22 into the shadowed region, and the mobile 40a can be supplied with radio services. In this exemplary embodiment, the predefined space 25 has a shadowing region for the at least one transmission and/or reception antenna 22, and the element 24a is used such that a coverage quality of the radio system 20 in the shadowing region is increased.

FIG. 2 shows, in a second exemplary embodiment, a second mobile 40b that has a direct line of sight to the antenna 22 and would be perturbed by the reflected signals of the element 24a. In this regard, there is a second element 24b situated between the second mobile 24b and the first element 24a. The second element 24b may be an absorption area and practically shields the mobile 24b from the reflected signals, with the result that the mobile can communicate directly with the antenna 22. In this exemplary embodiment, the element 24b is used such that the element produces a shadowing region for the at least one transmission and/or reception antenna in the predefined space (in this case behind the element 24b where the second mobile 40b is situated). The active area may be an absorption area or a reflection area.

FIG. 2 therefore illustrates that the active area of the element 24a, 24b may, in exemplary embodiments, be an absorption area or a reflection area. Some exemplary embodiments can thus bring about an improvement in channel capacity, lowering of the signal power, lowering of perturbations, an improvement in locating quality or even an improvement in occupancy state detection in the predefined space 25, e.g., in a vehicle. Exemplary embodiments also provide a vehicle that comprises a predefined space or interior 25.

Exemplary embodiments are in this case not limited to specific access technologies and can use or extend any wireless and mobile radio technologies (e.g., WLAN IEEE 802.11ad, 5G). A characteristic of these technologies is, inter alia, a higher frequency range (in the upper GHz range), which permits simpler implementation of beamforming technologies, since the wavelength is shorter and hence any antenna elements become substantially smaller. These are already standardized in part in the aforementioned technologies. In some exemplary embodiments, the predefined space is a vehicle interior, for example, inside an airplane, a train, a bus or a motor car. There is not always a direct line of sight in the vehicle interior, which means that a beam cannot be aimed directly at the receiver in this case. This problem can be overcome by suitable reflector elements 24a or absorption elements 24b. In at least some exemplary embodiments, absorption areas may be embodied such that multiple reflections and resultant maxima and minima of the electromagnetic field are reduced or even minimized. The reflectors used may, in exemplary embodiments, be generally conductive areas, for example, metal areas that purposefully bring about reflections.

In this case, a reflector (possibly also an absorption area) can also be brought or switched to an appropriate potential, e.g., a reference potential of a vehicle. An insulated reflection and/or absorption area would also be conceivable. An artificial reflector of this kind may have its geometry adapted to the circumstances of the respective exemplary embodiment, for example, it may be planar or curved, and it differs simply by virtue of this geometric or electrical adaptation of natural reflectors that occur in the surroundings of the radio system 20. In some exemplary embodiments, the influencing of the propagation conditions of the signals of the radio system results just from an interaction between the at least one artificially introduced element and natural reflectors and/or absorption areas. Absorption of radio waves can be achieved by means of materials with correspondingly high absorption coefficients (e.g., through ionization) and adapted surface structures (for example, pyramidal or conical surface elements).

General rules regarding shape and position cannot be complied with, since these are vehicle- and installation-specific with regard to the transmitter or the receiver. The absorption areas can be realized by suitable absorption materials, for example.

Figure 3:
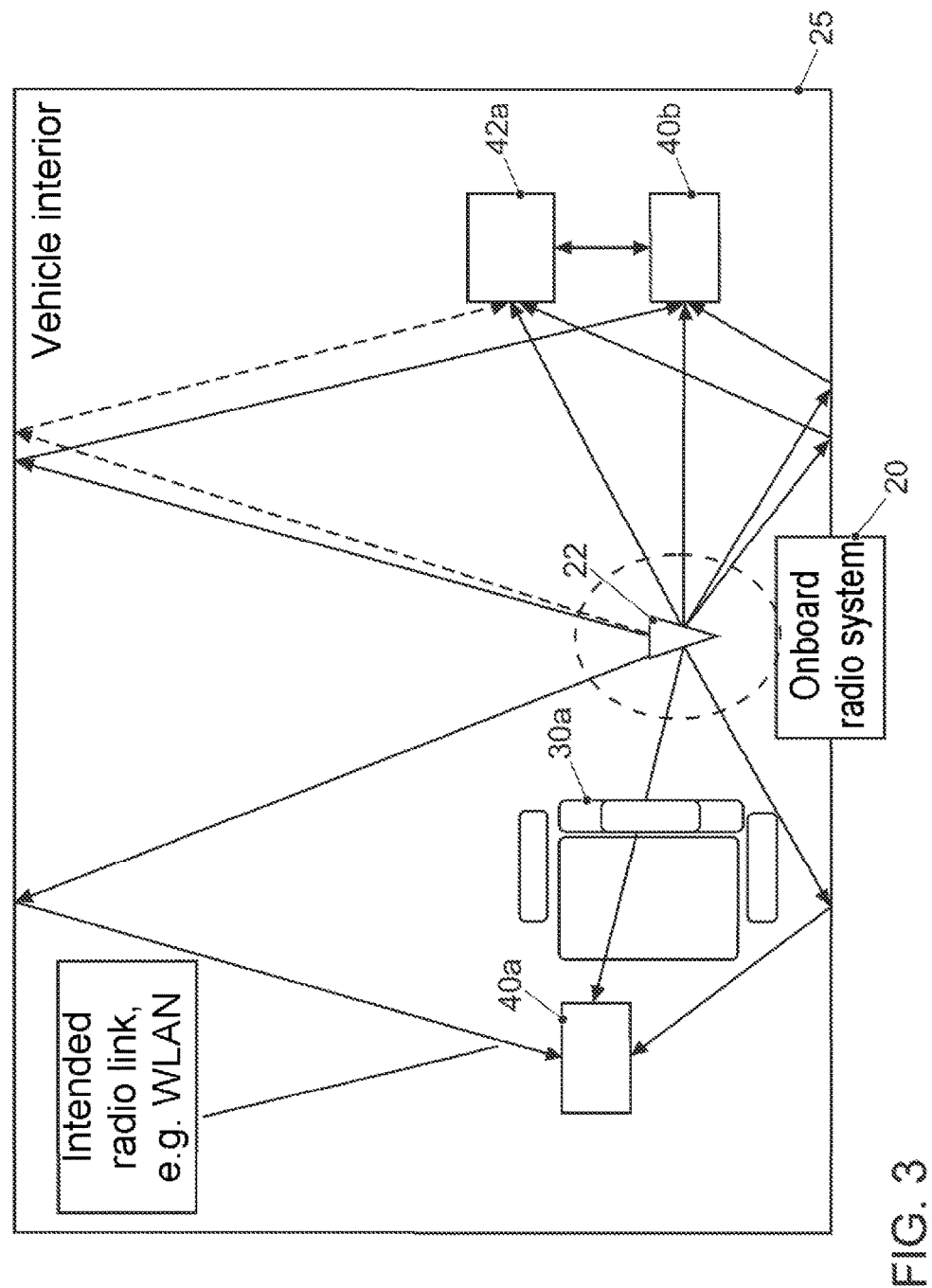
FIG. 3 shows an overall view of radio propagation conditions in a motor vehicle interior.

FIG. 3 shows an overall view of radio propagation conditions in a motor vehicle interior as a predefined space 25 with an onboard radio system 20, which in this exemplary embodiment has an omnidirectional antenna 22, as indicated by the dashed lines. The exemplary embodiments that follow accordingly each also show a vehicle with a radio system 20 in accordance with the description above. In the vehicle, there are two mobile devices UE1, 40a and UE2, 40b. In this scenario, the mobile device 40b here also communicates with a further cordless device 42a, for example, a set of headphones (headset, BLUETOOTH® headset). There is accordingly a parallel radio link from the mobile device 40b to the cordless device 42a. As shown by the dashed arrow on the antenna 22 by means of a reflection at an end of the interior 25 opposite the antenna 22, there is an unwanted noise path or a noise signal at that point. A signal that is intended for communication between the antenna 22 and the mobile device 40a accordingly perturbs the connection between the mobile device 40b and the cordless device 42a.

The onboard radio system 20 uses the antenna 22 to also communicate with the mobile device 40a, which is in the shadow of a seat 30a in this case. As indicated by the arrows, there are three paths here: a first path runs via a reflection at an end of the space 25 opposite the antenna 22, a second path runs via a reflection at a side of the interior facing the antenna 22, and a third path runs through the seat 30a, which causes attenuation or path attenuation. The communication with the two mobile devices 40a and 40b can take place, e.g., via WLAN in this case, and the communication between the mobile device 40b and the cordless device 42a can take place via BLUETOOTH®. The simultaneous use of multiple radio systems in the same frequency band can result in coexistence problems between the systems. As depicted in simplified form in FIG. 3, the communication between the onboard radio system 20 and UE1 40a perturbs, e.g., the communication between a BLUETOOTH® headset 42a and UE2 40b as a result of the even and hence uncontrolled signal propagation in the vehicle interior 25.

Figure 4:
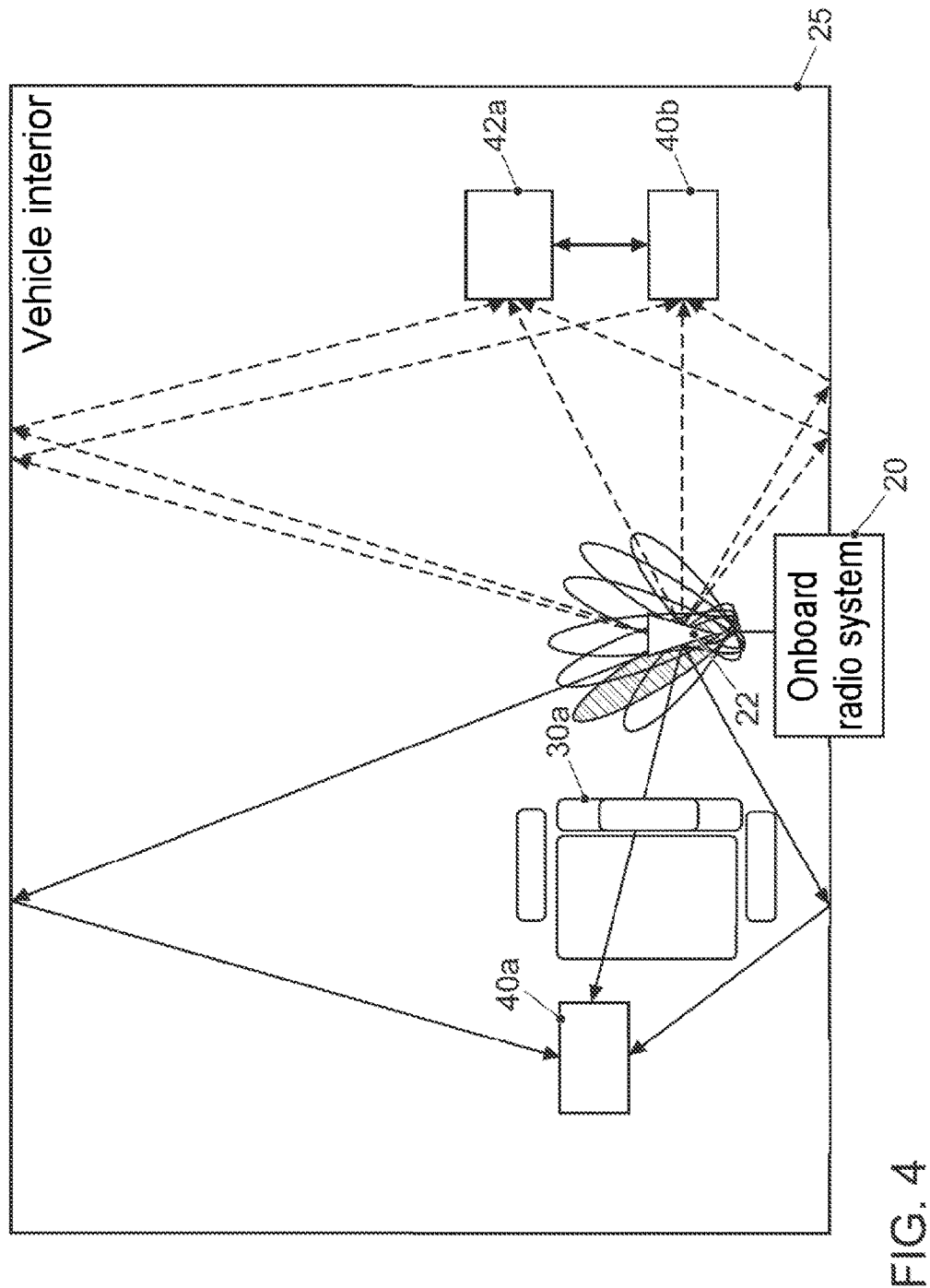
FIG. 4 shows an overall view of radio propagation conditions and coverage regions in a motor vehicle interior using beamforming.

FIG. 4 shows an overall view of radio propagation conditions and coverage regions in a motor vehicle interior using beamforming. FIG. 4 illustrates the same components as FIG. 3. In FIG. 4, the transmission and/or reception antenna 22 may be a beamforming antenna and provides the option of selecting between different preferential directions (beams) for reception and for transmission, as indicated by the antenna lobes around the antenna 22 in FIG. 4. Through selection of the shaded beam, the transmission power can be steered in the direction of the paths of the first mobile device 40a and away from the paths in the direction of the mobile device 40b and the cordless device 42a. In this respect, beamforming can reduce noise, or improve a signal-to-noise ratio, depending on the selected beam. The use of beamforming systems can at least partly reduce the perturbation of the BT headset UE2 40b, 42a communication.

Figure 5:
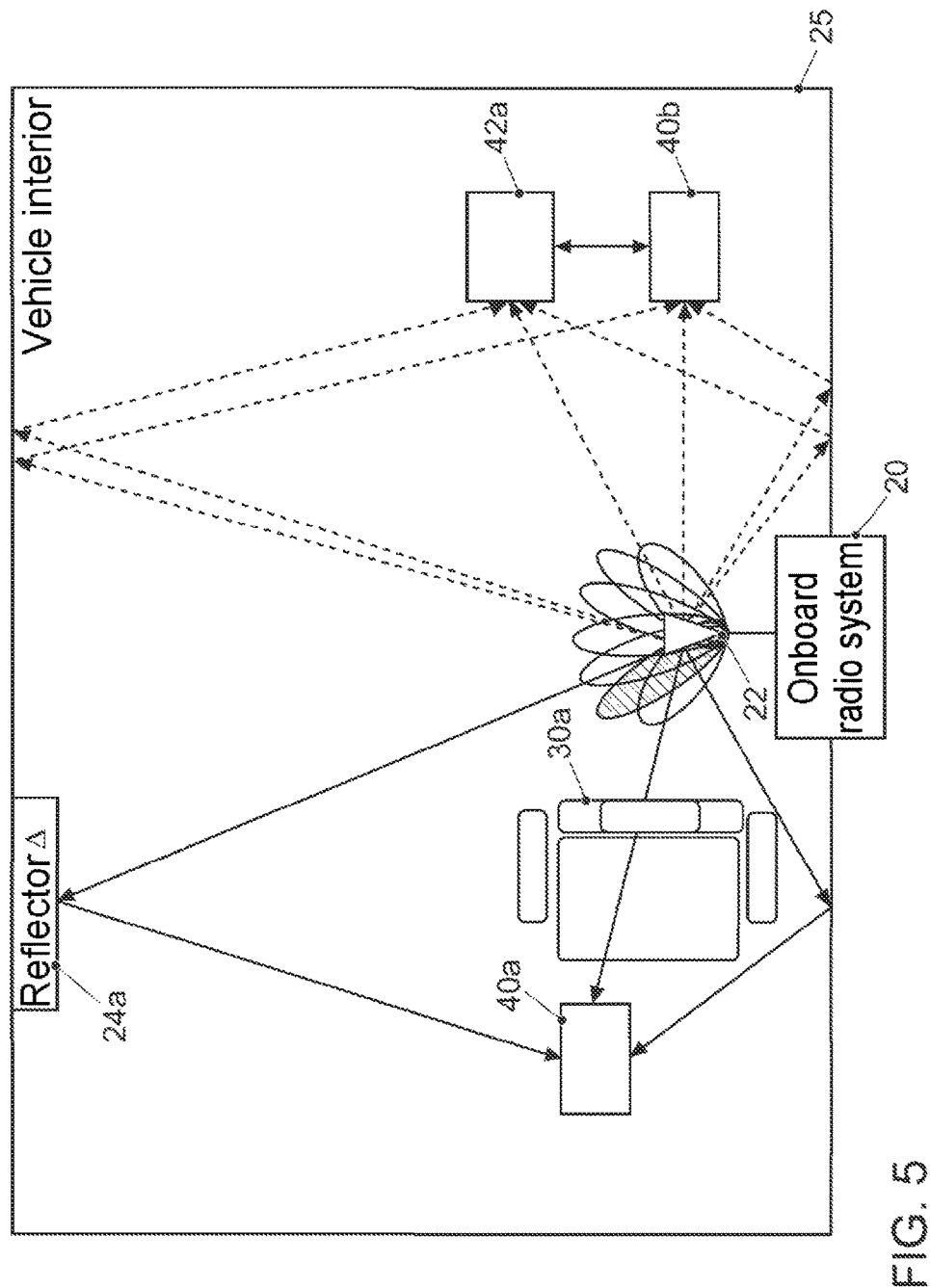
FIG. 5 shows an overall view of radio propagation conditions and coverage regions in a motor vehicle interior using beamforming and a reflector in an exemplary embodiment.

FIG. 5 illustrates an overall view of radio propagation conditions and coverage regions in a motor vehicle interior using beamforming and two reflectors, a natural reflector and an artificial reflector 24a, in one exemplary embodiment. FIG. 5 shows a similar scenario to both of FIGS. 3 and 4. Usable signal paths are denoted by solid arrows and noise signals are denoted by dashed arrows. In the exemplary embodiment of FIG. 5, the reflector 24a is used to produce purposeful reflection, so that the usable signal all in all is obtained from the path reflected at the bottom, the path reflected at the top and the attenuated path via the seat 30a. The reflected paths likewise undergo some attenuation in this case as a result of the reflection, the attenuation being able to be rendered more controllable through the introduction of the reflector 24a, however. For the noise signals for the second mobile device 40b and the cordless device 42a, similar conditions to those already described with reference to FIG. 4 are obtained. The combined use of beamforming systems and reflectors 24a can reduce the perturbation of the BT headset UE2 communication (40b, 42a) much more effectively, since the onboard radio system 20 reduces the signal power (e.g., on account of good reflection properties of the reflector 24a), and hence there is a further reduction in the noise signal influence. In addition, the channel capacity (data rate) can therefore be improved.

Figure 6:
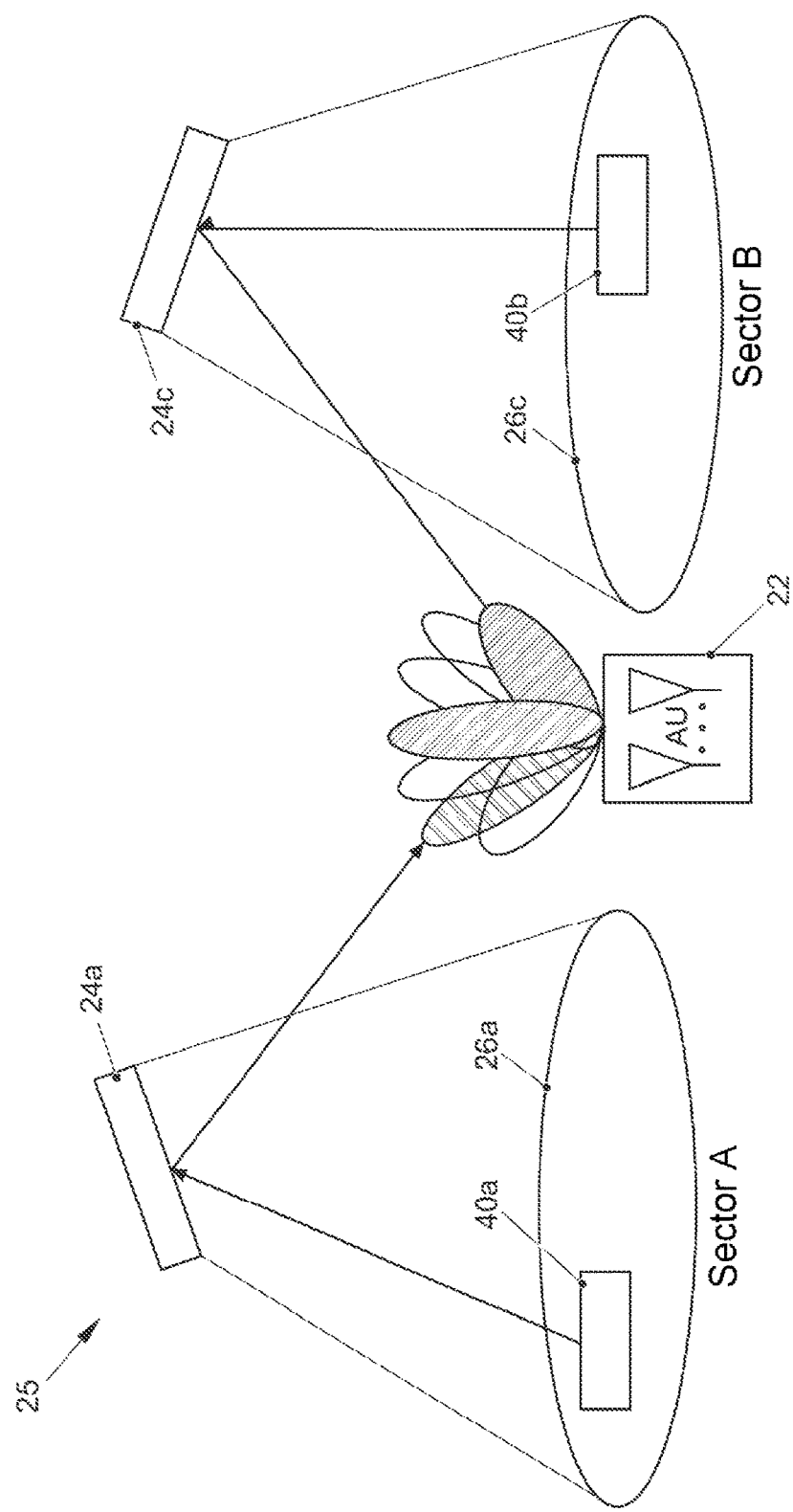
FIG. 6 shows an overall view of radio propagation conditions and coverage regions in a motor vehicle interior using beamforming and two reflectors in an exemplary embodiment.

FIG. 6 shows an overall view of radio propagation conditions and coverage regions in a motor vehicle interior 25 using beamforming and two reflectors 24a, 24c in one exemplary embodiment. In this exemplary embodiment, multiple elements 24a, 24c having active areas are used to divide the predefined space 25 into radio coverage subregions or sectors 26a, 26c. Additionally, or alternatively, it is also possible for operation of multiple antennas to be performed for the purpose of selection or beamforming. In the exemplary embodiment of FIG. 6, the beamforming antenna 22 provides multiple radiation directions, as has already been explained above. Purposeful actuation of the beams results in different illumination regions for the different beams, the illumination regions also being able to be referred to as sectors 26a, 26c (sector A, sector B). The combination of beamforming and reflector placement in the vehicle produces regions/sectors that are separate in terms of radio engineering and allow an improved noise signal situation. By way of example, the predefined space 25 corresponds to an interior of a vehicle, and the subregion can correspond to a seat in the interior of the vehicle. In this respect, the individual seats can then be supplied with radio signals at the same frequency at the same time, and hence the efficiency of the system can be increased. Space division multiple access is provided by the individual sectors 26a, 26c, which can be oriented to the seats or groups of seats (e.g., in larger means of transport such as trains or airplanes), for example. The radio system 20 may accordingly be designed to cover two or more seats of the vehicle using the same frequency and time resources.

Figure 7:
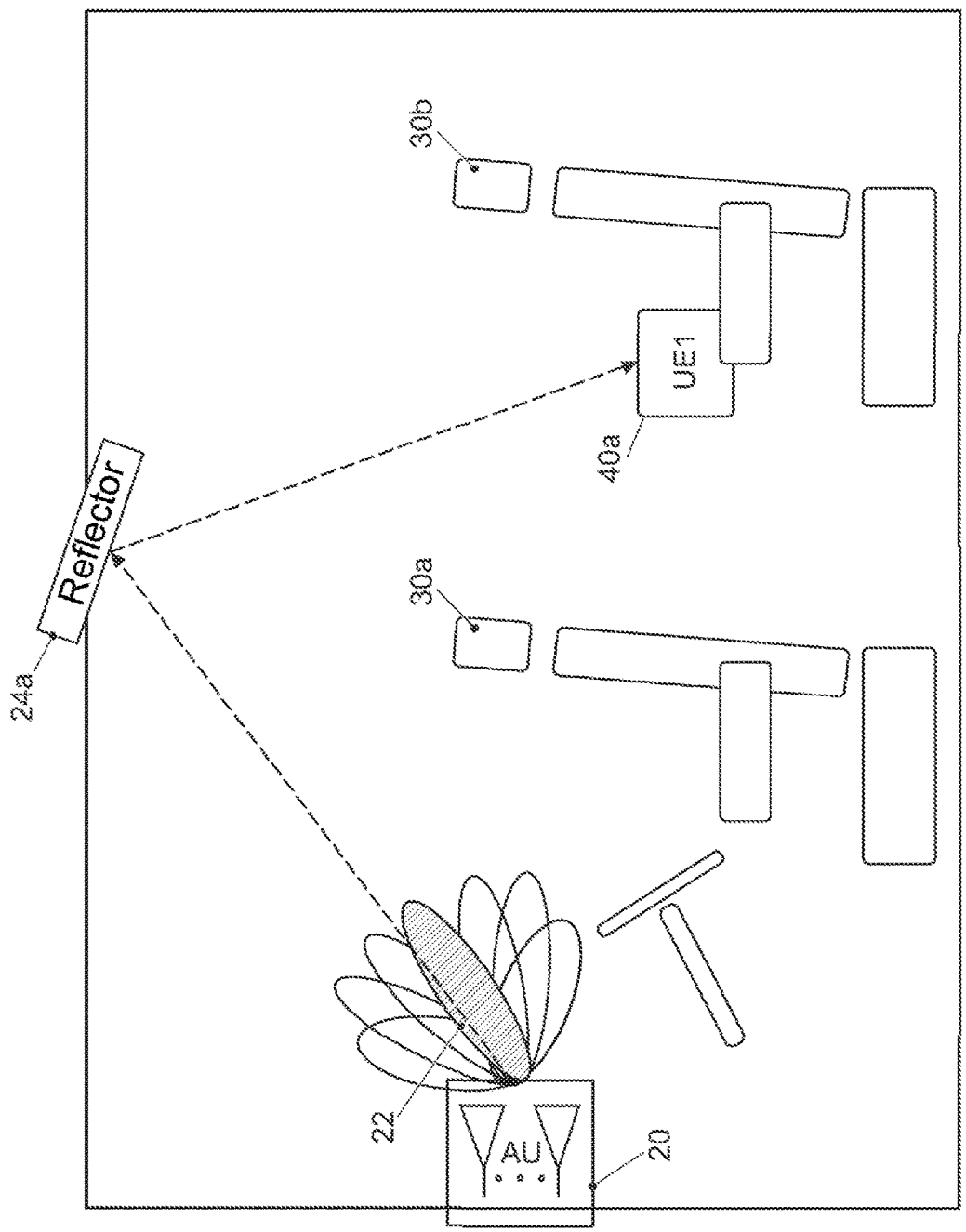
FIG. 7 shows a reflector mounted in a roof region of a vehicle interior in an exemplary embodiment.

FIG. 7 shows a reflector 24a mounted in a roof region of a vehicle interior 25 in a further exemplary embodiment.

FIG. 7 shows the vehicle interior 25 in a side view, with the radio system 20, the beamforming antenna 22, the reflector 24a on the roof and two shadowing seats 30a and 30b. A mobile device 40a is situated between the two seats 30a, 30b and is supplied with the radio signals of the radio system 20 via a reflection from the roof reflector 24a. In this exemplary embodiment, the element 24a is used on the inside of the roof of the vehicle.

Figure 8:
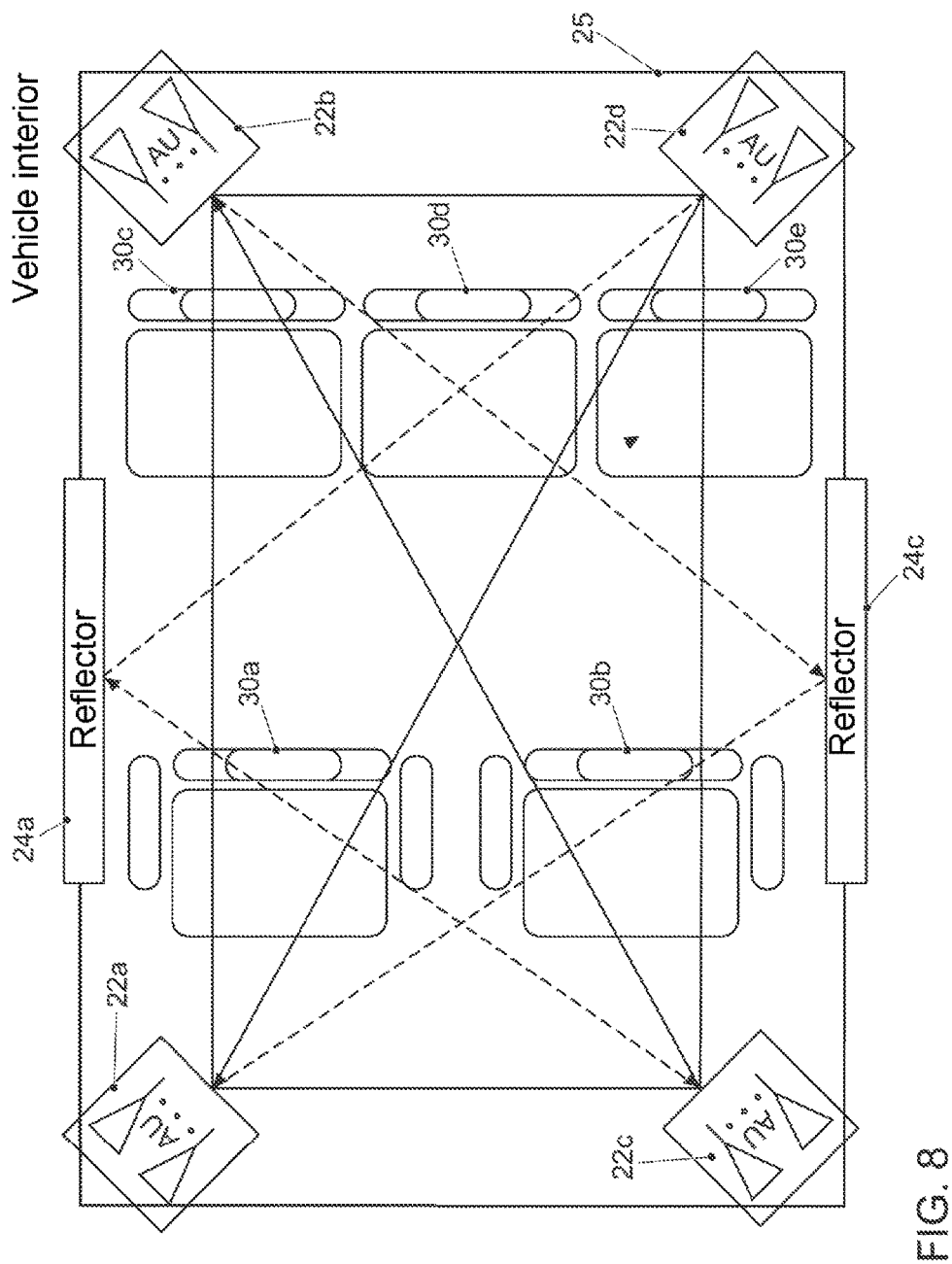
FIG. 8 shows an exemplary embodiment of a radio system with two reflectors on the B pillar of a vehicle.

FIG. 8 illustrates a further exemplary embodiment of a radio system 20 having two reflectors 24a, 24c on the B pillar of a vehicle. In this exemplary embodiment, the element 24a or 24c is used on a B pillar of the vehicle. FIG. 8 shows a vehicle interior with five seats 30a, 30b, 30c, 30d, 30e, which act as shadowing elements. Furthermore, there are four transmission and/or reception antennas 22a, 22b, 22c and 22d arranged in the motor vehicle interior 25, which each have multiple beamforming options (beams). By selecting (changing over) the different directions, it is thus possible to purposefully address mobile transceivers and to reject perturbations (interference). On reception, it is possible to receive signals from the preferential directions, noise powers that come from other directions thus being able to be reduced or rejected. The use of the reflectors 24a, 24c in the vehicle interior 25 thus brings about artificial and intentional reflections. These could be used for finer detection of the occupancy state without additional antenna units (AUs) being installed. The additional paths that are introduced into the space 25 by the reflectors 24a, 24c in a predictable manner also result in additional detection options for occupancy detection. In this case, the individual combinations of the beams of the antenna units can be continually iterated and attenuations on specific paths can be detected. From the attenuations, it is then possible to determine seat occupancy.

Figure 9:
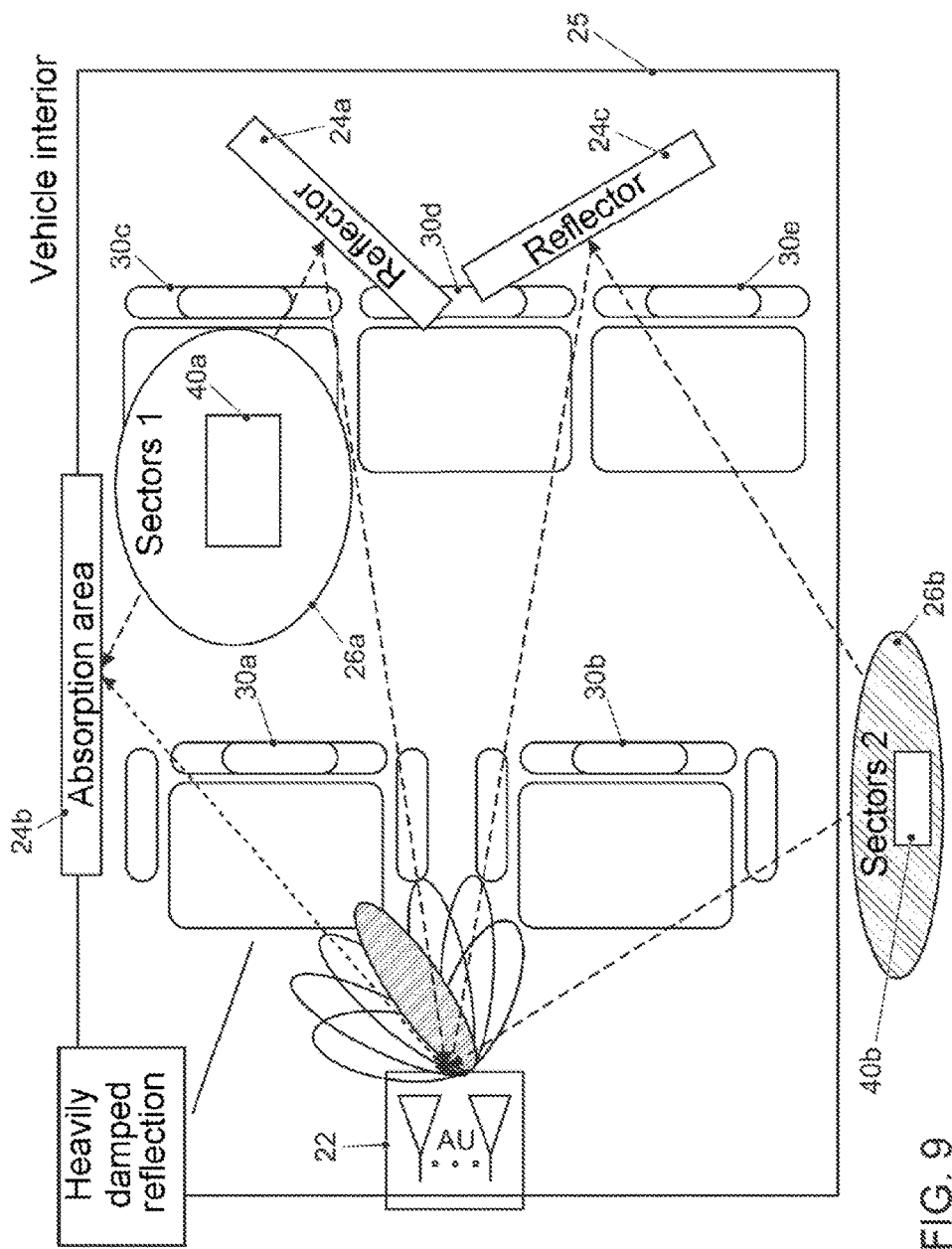
FIG. 9 shows a further exemplary embodiment of a radio system with an absorption area.

FIG. 9 shows a further exemplary embodiment of a radio system with an absorption area 24b. In this exemplary embodiment, the antenna unit 22 is fitted at the front of the interior 25 and again has multiple radiation directions (beams). In the rear region of the interior, there are two reflectors 24a and 24c, the resultant reflections being shown by dashed lines. Overall, the two sectors 26a, 26b can be formed in whose coverage regions the two mobile devices 40a and 40b are situated. As FIG. 9 further depicts, the reflection from the absorption area 24b is sharply attenuated, so that this radiation direction can be used to cover the passenger seat in this exemplary embodiment without substantially perturbing the sector 26a.

This exemplary embodiment depicts by way of example how this strategy can also be used for locating mobile radio units 40a, 40b (UEs) to increase locating quality in comparison with the conventional approaches. In this exemplary embodiment, the mobile device 40b UE2 is situated outside the vehicle and is received well using the lower two shaded beam settings (radio radiation direction settings). An initial calibration measurement and the measured reception characteristic of all beams together with the reflector implementation restricts locating to the sector 26b, which is situated outside the interior 25. Under some circumstances, it would also be possible to implement still further absorption areas to attenuate unwanted reflections and thus to distinguish the sectors to a greater extent.

For locating the mobile device 40a, the absorption area 24b is used here for better quality to attenuate the signal power components of the received signal that are produced by unwanted reflections. This can improve the unambiguity of the position estimate.

Figure 10:
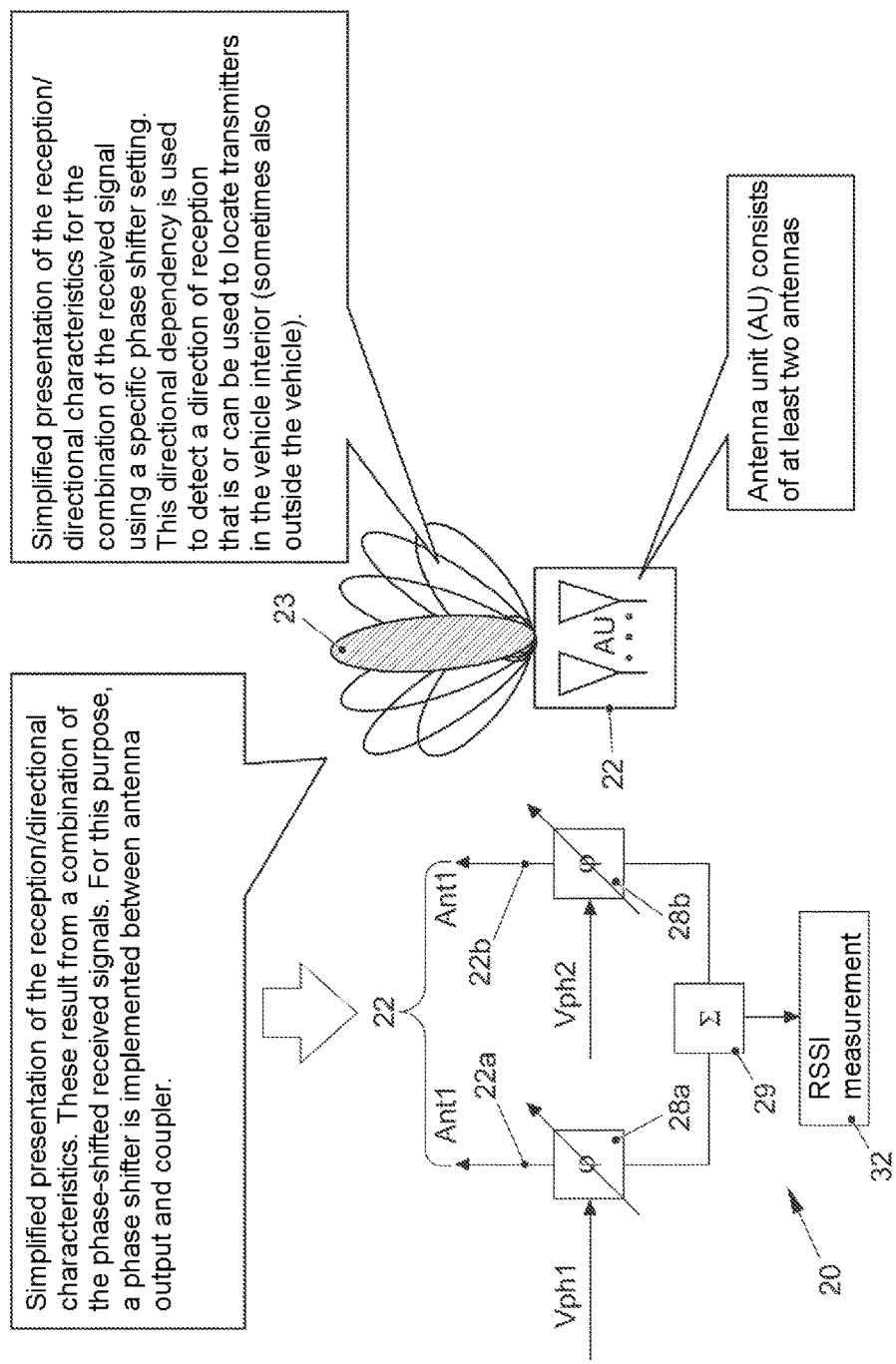
FIG. 10 shows an exemplary embodiment of an antenna unit for beamforming.

FIG. 10 illustrates an exemplary embodiment of an antenna unit 22 for beamforming. The left-hand side of FIG. 10 shows a block diagram of an exemplary embodiment of a radio system 20. The radio system comprises two antenna elements 22a and 22b of an antenna unit 22. The antenna unit 20 further comprises two phase shifters 28a and 28b that can be used to modify the phases of the signals from the antenna elements 22a and 22b. FIG. 10 illustrates the case of reception, the case of transmission being analogous in the opposite transmission direction. In a summator 29, the signals are then added, with constructive and/or destructive superposition being obtained depending on the relative phase angle. Based on the summed signal, it is then possible to determine a measure of power for the received signal. In the exemplary embodiment of FIG. 10, this is accomplished by the component 32, which determines a receive signal strength indicator. Depending on the phase shifter settings, it is then possible to ascertain that phase setting for which a high or even the highest RSSI value is obtained.

This then corresponds to a spatial radiation characteristic that is dependent not only on the relative phase setting but also on the geometric arrangement of the antenna elements. The exemplary embodiment of FIG. 10 shows the phase shifters integrated in the radio system 20. In further exemplary embodiments, it is also conceivable for the phase shifters to be arranged outside the apparatus 20. The phase shifters 28a, 28b can also have a discrete range of values, i.e., a certain predefined number of phase values can be set therein. Furthermore, the phase shifters can also be combined, so that predefined relative phase settings between the antenna elements can be selected. This can be effected in analog or digital form in exemplary embodiments. By way of example, a Butler matrix (analog phase settings in the radio-frequency range) can be used to select predefined antenna lobes.

The middle of FIG. 10 shows a block diagram of an antenna unit 22 (AU) in at least one exemplary embodiment, the antenna unit comprising at least two antenna elements. The antenna unit 22 allows a selection between multiple main radiation directions, the main radiation direction 23 being deemed to have been selected in the exemplary embodiment shown. FIG. 10 illustrates a simplified depiction of the reception/directional characteristics. These are produced by the combination of the phase-shifted received signals. For this purpose, a phase shifter is implemented between the antenna output and the coupler. For the simplified depiction of the reception/directional characteristic, the received signals are combined by means of a specific phase shifter setting. This direction dependency is used to detect a reception direction that is or can be used to locate transmitters in the vehicle interior (under some circumstances also outside the vehicle).

By selecting (changing over) the different directions, it is thus possible to purposefully address mobile transceivers and to reject perturbations (interference). On reception, it is thus possible to receive signals from the preferential directions, noise powers that come from other directions thus being able to be reduced or rejected.

In at least one exemplary embodiment, it is accordingly possible for different modes of operation to be chosen for the antenna units 22. E.g., the first mode of operation may be transmission and the second mode of operation may be reception. An antenna unit is then used for transmission and one or more second antenna units are used for reception. For example, the first antenna unit has the radiation characteristics shown in FIG. 10, which are then continually varied and influence the transmission properties toward the second antenna unit. In a further exemplary embodiment, the second mode of operation may be transmission and the first mode of operation may be reception. The second antenna unit is then used for reception and the first antenna unit used for transmission. By way of example, the first antenna unit has the radiation characteristics shown in FIG. 10 (now reception characteristics), which are then continually varied and influence the transmission properties away from the second antenna unit.

In this respect, exemplary embodiments can, by virtue of the active area introduced, also assist calibration or characterization of a plurality of antenna units, which can then be used later for occupancy detection, for example.

A further exemplary embodiment is a motor vehicle or a vehicle in general with a radio system 20 or that is designed to carry out a method as described herein.

Depending on specific implementation requirements, exemplary embodiments may be implemented in hardware or in software. The implementation may be performed using a digital storage medium, for example, a floppy disk, a DVD, a Blu-Ray disc, a CD, a ROM, a PROM, an EPROM, an EEPROM or a FLASH memory, a hard disk or some other magnetic or optical store on which electronically readable control signals are stored which can interact or do interact with a programmable hardware component in such a way that the respective method is performed.

A programmable hardware component may be formed by a processor, a computer processor (CPU =central processing unit), a graphics processor (GPU=graphics processing unit), a computer, a computer system, an application-specific integrated circuit (ASIC), an integrated circuit (IC), a single-chip system (SOC=system on chip), a programmable logic element or a field programmable gate array (FPGA) with a microprocessor.

The digital storage medium may therefore be machine- or computer-readable. Some exemplary embodiments thus comprise a data carrier having electronically readable control signals that are able to interact with a programmable computer system or a programmable hardware component in such a way that one of the methods described herein is performed. At least one exemplary embodiment is thus a data carrier (or a digital storage medium or a computer-readable medium) on which the program for performing one of the methods described herein is recorded.

Generally, exemplary embodiments may be implemented as program, firmware, computer program or computer program product comprising a program code or as data, wherein the program code or the data is or are effective to the extent of performing one of the methods when the program runs on a processor or a programmable hardware component. The program code or the data may, for example, also be stored on a machine-readable carrier or data carrier. The program code or the data may be present, inter alia, as source code, machine code or byte code and as some other intermediate code.

The exemplary embodiments described above merely constitute an illustration of the principles of the embodiments. It goes without saying that modifications and variations of the arrangements and details described herein will become apparent to others skilled in the art. Therefore, the intention is that the embodiments shall be restricted only by the scope of protection of the following patent claims and not by the specific details that have been presented on the basis of the description and the explanation of the exemplary embodiments herein.

LIST OF REFERENCE SYMBOLS 12 operating at least one transmission/reception antenna
14 using an element having an active area
20 radio system
22,22a-d transmission and/or reception antenna, antenna unit
23 beam
24a-c elements having an active area (reflection area/absorption area)
25 predefined space, interior of a vehicle
26a-c sectors
27 transceiver
28a,b phase shifter
29 summator, summing element
30,30a-e shadowing object, seats
40a,b mobile device
42a cordless device

The invention claimed is:

1. A method for operating a radio system in a predefined space of a vehicle, the method comprising:
  operating at least one beamforming antenna in the predefined space to cover at least one subregion of the predefined space; and
  using at least one element having an active area in the predefined space taking into consideration the subregion to be covered,
  wherein the at least one beamforming antenna has a corresponding shadowing region within the predefined space of the vehicle,
  wherein the active area of the element influences propagation conditions of signals of the radio system within the predefined space of the vehicle,
  wherein multiple elements are positioned in the predefined space of the vehicle and have active areas that divide the predefined space into sectors, and
  wherein space division multiple access is provided for the individual sectors.

2. The method of claim 1, wherein the active area is an absorption area or a reflection area.

3. The method of claim 1, wherein the element is used to increase a coverage quality of the radio system in the shadowing region.

4. The method of claim 1, wherein the element is used to produce the shadowing region for the at least one beamforming antenna in the predefined space.

5. The method of claim 1, wherein the radio system is a BLUETOOTH® system or a wireless local area network system.

6. The method of claim 1, wherein the predefined space corresponds to an interior of the vehicle.

7. The method of claim 6, wherein the subregion corresponds to a seat in the interior of the vehicle.

8. The method of claim 6, further comprising using the element on the inside of the roof of the vehicle.

9. The method of claim 6, further comprising using the element on a side of the vehicle.

10. The method of claim 1, wherein the predefined space corresponds to an interior of a vehicle, wherein the radio system covers two or more seats of the vehicle using the same frequency and time resources, and wherein the method further comprises orienting the sectors to the seats or to groups of seats.

11. The method of claim 10, wherein space division multiple access is provided for the individual sectors.

12. The method of claim 10, wherein the radio system covers two or more seats of the vehicle using the same frequency and time resources, wherein the sectors are oriented to the seats or to groups of seats.

13. A computer program including instructions for a method for operating a radio system in a predefined space of a vehicle when the computer program runs on a computer, a processor or a programmable hardware component, the method comprising:
- operating at least one beamforming antenna in the predefined space to cover at least one subregion of the predefined space; and
- using at least one element having an active area in the predefined space taking into consideration the subregion to be covered,
- wherein the at least one beamforming antenna has a corresponding shadowing region within the predefined space of the vehicle,
- wherein the active area of the element influences propagation conditions of signals of the radio system within the predefined space of the evehicle,
- wherein multiple elements are positioned in the predefined space of the vehicle and have active areas that divide the predefined space into sectors, and
- wherein space division multiple access is provided for the individual sectors.

14. A radio system for providing coverage with radio services for a predefined space of a vehicle, the radio system comprising:
- at least one beamforming antenna in the predefined space to cover at least one subregion of the predefined space; and
- at least one element having an active area that influences propagation conditions of signals of the radio system,
- wherein the at least one element is positioned in the predefined space taking into consideration the subregion to be covered,
- wherein the at least one beamforming antenna has a corresponding shadowing region within the predefined space of the vehicle,
- wherein multiple elements are positioned in the predefined space of the vehicle and have active areas that divide the predefined space into sectors, and
- wherein space division multiple access is provided for the individual sectors.

15. The radio system of claim 14, wherein the active area is an absorption area or a reflection area and/or wherein the radio system is a BLUETOOTH® system or wireless local area network system.

16. The radio system of claim 14, wherein the predefined space corresponds to an interior of the vehicle, wherein the radio system covers two or more seats of the vehicle using the same frequency and time resources, and wherein the sectors are oriented to the seats or to groups of seats.

17. A vehicle having a radio system in a predefined space of the vehicle, the radio system comprising:
- at least one beamforming antenna in the predefined space to cover at least one subregion of the predefined space; and
- at least one element having an active area that influences the propagation conditions of signals of the radio system,
- wherein the at least one beamforming antenna has a corresponding shadowing region within the predefined space of the vehicle,
- wherein the at least one element is arranged in the predefined space taking into consideration the subregion to be covered,
- wherein multiple elements are positioned in the predefined space of the vehicle and have active areas that divide the predefined space into sectors, and
- wherein space division multiple access is provided for the individual sectors.

18. The vehicle of claim 17, wherein the active area is an absorption area or a reflection area and/or wherein the radio system is a BLUETOOTH® system or wireless local area network system.

19. The vehicle of claim 17, wherein the radio system covers two or more seats of the vehicle using the same frequency and time resources, wherein the sectors are oriented to the seats or to groups of seats.

* * * * *